United States Patent
Lowe et al.

(10) Patent No.: US 9,988,307 B2
(45) Date of Patent: Jun. 5, 2018

(54) EMULSION POLYMER TWO-COMPONENT COMPOSITIONS FOR FAST CURING CEMENTITIOUS WATERPROOFING MEMBRANES

(71) Applicants: Rohm and Haas Company, Philadelphia, PA (US); Dow Global Technologies LLC, Midland, MI (US)

(72) Inventors: Jennifer Lowe, Royersford, PA (US); Margarita Perello, Duebendorf (CH); Marc Schmitz, Verden/Aller (DE); Jouko Vyoerykkae, Waedenswil (CH)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 29 days.

(21) Appl. No.: 15/320,526

(22) PCT Filed: Jun. 10, 2015

(86) PCT No.: PCT/US2015/035032
§ 371 (c)(1),
(2) Date: Dec. 20, 2016

(87) PCT Pub. No.: WO2015/199984
PCT Pub. Date: Dec. 30, 2015

(65) Prior Publication Data
US 2017/0226013 A1      Aug. 10, 2017

Related U.S. Application Data

(60) Provisional application No. 62/016,851, filed on Jun. 25, 2014.

(51) Int. Cl.
| C04B 28/06 | (2006.01) |
| C04B 24/26 | (2006.01) |
| C04B 24/06 | (2006.01) |
| C04B 14/36 | (2006.01) |
| C04B 28/04 | (2006.01) |
| C04B 14/06 | (2006.01) |
| C04B 111/27 | (2006.01) |
| C04B 103/00 | (2006.01) |
| C04B 111/34 | (2006.01) |

(52) U.S. Cl.
CPC .......... *C04B 24/2688* (2013.01); *C04B 14/06* (2013.01); *C04B 14/36* (2013.01); *C04B 24/06* (2013.01); *C04B 28/04* (2013.01); *C04B 28/06* (2013.01); *C04B 2103/0065* (2013.01); *C04B 2111/27* (2013.01); *C04B 2111/343* (2013.01)

(58) Field of Classification Search
CPC ..... C04B 14/06; C04B 14/36; C04B 24/2688; C04B 28/04; C04B 28/06
USPC ................................... 524/2, 4, 5
See application file for complete search history.

(56) References Cited

U.S. PATENT DOCUMENTS

| 6,423,805 B1 | 7/2002 | Bacho et al. |
| 2011/0312240 A1 | 12/2011 | Amthor et al. |

FOREIGN PATENT DOCUMENTS

| CA | 2306020 A1 | 10/2000 |
| CN | 101891859 A | 11/2010 |
| CN | 102936460 A | 2/2013 |
| EP | 2582761 A1 | 4/2013 |
| JP | 07268166 | 10/1995 |
| JP | 07268167 | 10/1995 |
| JP | 2005015330 A | 1/2005 |
| JP | 2005350289 A | 12/2005 |
| JP | 2009234881 A | 10/2009 |
| WO | 200128955 A1 | 4/2001 |

*Primary Examiner* — Edward J Cain
(74) *Attorney, Agent, or Firm* — Andrew Edwin Cox Merriam

(57) ABSTRACT

The present invention provides two-component compositions comprising a component A) one or more acrylic aqueous emulsion copolymer having a measured glass transition temperature ($T_g$) of from −20 to 0° C. and which is the copolymerization product of (i) from 60 to 89.9 wt. % of one or more nonionic (meth)acrylic monomers, (ii) from 10 to 40 wt. % of one or more vinyl aromatic monomers, (iii) from 0.1 to 2.0 wt. % of one or more monomers chosen from itaconic acid, methacrylic acid, amides of a,β-unsaturated $C_3$ to $C_6$ carboxylic acids, and mixtures thereof, all wt. %s of monomers based on the total monomer solids, wherein the aqueous emulsion copolymer has at least one residue of an ascorbic acid reducing agent or is the copolymerization product of a monomer (iii) comprising itaconic acid, and, a separate component B) comprising a fast curing dry mix powder composition of a hydraulic cement and a high alumina content cement.

10 Claims, No Drawings

EMULSION POLYMER TWO-COMPONENT COMPOSITIONS FOR FAST CURING CEMENTITIOUS WATERPROOFING MEMBRANES

The present invention relates to two-component compositions for use in making cementitious waterproofing membranes comprising as component A) one or more acrylic aqueous emulsion copolymer having a measured glass transition temperature ($T_g$) of from −40 to 0° C., preferably, −20 to 0° C., and comprising the residue of a reducing agent, and, as a separate component B) a fast curing dry mix powder composition of a hydraulic cement and a high alumina content cement. More particularly, it relates to two component compositions wherein the A) aqueous emulsion copolymer is the copolymerization product of (i) from 60 to 89.9 wt. % of one or more nonionic (meth)acrylic monomers, (ii) from 10 to 40 wt. % of one or more vinyl aromatic monomers, (iii) from 0.1 to 2.0 wt. % of one or more monomers chosen from itaconic acid, methacrylic acid, amides of a,β-unsaturated $C_3$ to $C_6$ carboxylic acids, and mixtures thereof, all wt. %s of monomers based on the total monomer solids, wherein the aqueous emulsion copolymer has at least one residue of an ascorbic acid reducing agent or is the copolymerization product of a monomer (iii) comprising a mixture of itaconic acid and an amide of a,β-unsaturated $C_3$ to $C_6$ carboxylic acid.

Waterproofing membranes find use as the support and sealer layer underneath tiles in bathrooms, terraces, swimming pools and water tanks. In ordinary Portland cement (OPC) or standard two-component cementitious waterproofing membrane compositions, 2 mortar layers have to be applied to achieve sufficient thickness and waterproofing quality. When using OPC in a dry mix, the time to apply the second layer is after at least 24 hours.

Faster curing waterproofing membranes can be achieved by using fast setting cement calcium alumina cement (CAC). However, there are multiple challenges when using emulsion polymers in fast setting cement compositions. As the wet mortar thickens very fast, the applicability and workability becomes very difficult; pot life is unacceptably short and the resulting waterproofing membrane is too rigid, and thereby lacks flexibility and often cracks so that it is not waterproof. Further, in fast setting waterproofing membrane compositions, the emulsion polymer does not provide enough flexibility to give sufficient crack bridging in dry/wet conditions. One very expensive way to solve the problem of the rigidity of the resulting waterproofing membrane would be to reduce the glass transition temperature (Tg) of the emulsion polymer, making it softer and more flexible, and to increase significantly the polymer to cement ratio.

An effective fast drying waterproofing membrane would enable the applicator to apply a first and a second waterproofing membrane layer and then a tile layer on the resulting waterproofing membrane within the same working day.

U.S. Pat. No. 6,423,805, to Bacho et al., discloses acrylic or vinyl aqueous emulsion polymer compositions comprising the polymerized product of a monomer mixture of one or more vinyl or acrylic monomers with from 1 to 3 wt. %, based on the total solids in the monomer mixture, of at least one monomer selected from the group consisting of amides of an α,β-unsaturated $C_3$ to $C_6$ carboxylic acid and N-vinyl lactams and at least 1 wt. % of at least one hydroxyalkyl (meth)acrylate. The compositions enable improved open time in a variety of standard cementitious compositions, such as grouts and even waterproofing membranes. However, the compositions comprise OPC or ordinary cement and enable development of strength after 24 hours; nothing in Bacho et al. addresses the need for fast curing cementitious compositions which do not crack when cured to form a waterproofing membrane.

The present inventors have sought to solve the problem of providing a two-component composition of a fast curing dry mix and an emulsion polymer additive that makes a wet mortar composition suitable for use as a fast curing waterproofing membrane without reducing the Tg of the polymer or increasing the polymer to cement ratio in the composition, while enabling both acceptable mortar pot life and flexibility in the final cured waterproofing membrane so that it does not crack as it cures.

STATEMENT OF THE INVENTION

1. In accordance with the present invention, two-component compositions comprise as one component A) one or more aqueous emulsion copolymer having a measured glass transition temperature ($T_g$) of from −40 to 0° C., preferably, −20 to 0° C., or, more preferably, from −15 to −5° C., and comprising the residue of a reducing agent, preferably, an ascorbic acid, such as isoascorbic acid, and, as a separate component B) a fast curing dry mix powder composition of a hydraulic cement and a high alumina content cement, wherein the aqueous emulsion copolymer in component A) is the copolymerization product of (i) from 60 to 89.9 wt. %, or, preferably, from 67.5 to 89.5 wt. % of one or more nonionic (meth)acrylic monomers, (ii) from 10 to 40 wt. % or, preferably, from 15 to 30 wt. % of one or more vinyl aromatic monomers, (iii) from 0.1 to 2.0 wt. % or, preferably, from 0.5 to 1.25 wt. % of one or more monomers chosen from itaconic acid, methacrylic acid, amides of a,β-unsaturated $C_3$ to $C_6$ carboxylic acids, preferably, (meth)acrylamide, and mixtures thereof, all wt. %s of monomers based on total monomer solids, with the proviso that the aqueous emulsion copolymer has at least one residue of an ascorbic acid reducing agent or is the copolymerization product of a monomer (iii) comprising a mixture of itaconic acid and an amide of a,β-unsaturated $C_3$ to $C_6$ carboxylic acid.

2. In accordance with item 1 of the present invention, above, when the aqueous emulsion copolymer of component A) is the copolymerization product of a monomer (iii) including the one or more amides of a,β-unsaturated $C_3$ to $C_6$ carboxylic acids, it further comprises the copolymerization product of (iv) one or more hydroxyalkyl (meth)acrylate, preferably, hydroxyethyl methacrylate.

3. In accordance with item 2 of the present invention, above, the aqueous emulsion copolymer of component A) comprises the copolymerization product of from 0.1 to 1.5 wt. %, or, preferably, from 0.25 to 1 wt. % of (iv) one or more hydroxyalkyl (meth)acrylate, all wt. %s of monomers based on total monomer solids.

4. In accordance with any of items 1, 2, or 3 of the present invention, above, the aqueous emulsion copolymer of component A) comprises the copolymerization product of (i) one or more nonionic (meth)acrylic monomers chosen from ($C_1$ to $C_{18}$) alkyl (meth)acrylates, ($C_5$ to $C_{10}$) cycloalkyl (meth)acrylates, and (meth)acrylonitrile, or, preferably, chosen from butyl acrylate, 2-ethylhexyl acrylate, lauryl acrylate, stearyl acrylate, isobornyl acrylate, methyl methacrylate, ethyl methacrylate, butyl methacrylate, isobutyl methacrylate, 2-ethylhexyl methacrylate, lauryl methacrylate, stearyl methacrylate, isobornyl methacrylate, acrylonitrile, and methacrylonitrile. Most preferably, the (i) one or more nonionic (meth)acrylic monomers are chosen from butyl acrylate, ethyl acrylate, 2-ethylhexyl acrylate, lauryl methacrylate, mixtures thereof, and mixtures thereof with another nonionic (meth)acrylic monomer.

5. In accordance with any of items 1, 2, 3, or 4 of the present invention, above the two-component composition comprises from 10 to 60 wt. % or, preferably, from 20 to 50 wt. %, or, more preferably, from 25 to 40 wt. % as solids of the one or more aqueous emulsion copolymer of component A), based on the total solids content of the composition.

6. In accordance with any of items 1, 2, 3, 4, or 5 of the present invention, above the aqueous emulsion copolymer of component A) comprises the copolymerization product of (ii) one or more vinyl aromatic monomers chosen from styrene, alkyl substituted styrene or, preferably, styrene, vinyl toluene, alpha-methyl styrene, and mixtures thereof.

7. In accordance with any of items 1, 2, 3, 4, 5, or 6 of the present invention, the reducing agent residue in the aqueous emulsion copolymer of component A) is present in amounts of from 0.1 to 0.5 wt. %, based on the total monomer solids used to make the aqueous emulsion copolymer, or, preferably, from 0.2 to 0.5 wt. %.

8. In accordance with any of items 1, 2, 3, 4, 5, 6, or 7 of the present invention, the fast curing dry mix powder composition component B) comprises from 1 to 35 wt. % or, preferably, from 1 to 15 wt. %, or, more preferably from 8 to 15 wt. % of high alumina content cement, based on total solids in component B).

9. In accordance with any of items 1, 2, 3, 4, 5, 6, 7, or 8 of the present invention, the fast curing dry mix powder composition component B) comprises from 0 to 15 wt. %, or, preferably, 0.3 to 10 wt. %, or, more preferably, 1.0 wt. % or more of calcium sulfate, based on the total solids in component B).

10. In accordance with any of items 1, 2, 3, 4, 5, 6, 7, 8, or 9 of the present invention, the fast curing dry mix powder composition component B) comprises from 15 to 65 wt. % or, preferably, 18 to 50 wt. %, hydraulic cement, such as ordinary portland cement.

11. In accordance with any of items 1, 2, 3, 4, 5, 6, 7, 8, 9 or 10 of the present invention, the fast curing dry mix powder composition component B) comprises from 30 to 85 wt. %., or, preferably, from 50 to 70 wt. % of one or more non-cementitious filler, such as sand, talc, clay or silica, based on the total solids in component B).

In another aspect of the present invention, methods of making a waterproofing membrane comprise combining components A) and B) in accordance with any one of items 1 to 11 of the present invention, above, to make a wet mortar, applying the wet mortar to a substrate and allowing the mortar to dry.

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(meth)acrylate" includes, in the alternative, acrylate or methacrylate.

As used herein, the term "dry mix" refers to a free flowing powder comprising cement which is storage stable and which remains so because it is sufficiently dry to avoid reaction. A dry mix may include a anhydrous filler, such as calcium sulfate anhydrates so long as the hydrous filler does not cause the dry mix to set up or "block" on storage. Blocked dry mixes are no longer free flowing powders and must be discarded.

As used herein, the term "EN" refers to the European Norm, published by de Normen durch Beuth Verlag GmbH, Berlin, DE (Alleinverkauf). The term "DIN" refers to the German language version of the EN, published by Beuth Verlag GmbH.

As used herein, the term "glass transition temperature" or "$T_g$" means the quantity as measured using differential scanning calorimetry or DSC of a polymer sample from −90° C. to 150° C. at a rate of heating 10° C. per minute to generate a calorimetry curve, with the $T_g$ taken at the midpoint of the inflection in the curve.

As used herein the term "setting" refers to the solidification of the plastic cement paste. See *Concrete—Microstructure, Properties, & Materials,* 3rd edition, P. Kumar Mehta et al., page 220. The beginning of solidification, called the initial set, marks the point in time when the paste has become unworkable. The paste does not solidify suddenly, but requires considerable time to become fully rigid. The time taken to solidify completely marks the final set.

As used herein, the phrase "total solids" refers to all non-volatiles which will remain in a dried waterproofing membrane; it thereby excludes water, volatile gases, such as ammonia, and any volatile solvents. The term "volatile" refers to things which boil off, vaporize or are present in gaseous state under use conditions which generally comprise atmospheric pressure and outdoor ambient temperatures of from about 7° C. to about 45° C.

As used herein, the phrase "wt. %" stands for weight percent.

The present inventors have found two-component compositions comprising an aqueous emulsion copolymer component and a fast setting high alumina content cement component that cure quickly when the components are combined to give waterproof and flexible waterproofing membranes. The compositions enable superior waterproofing performance, flexibility and crack bridging, and elongation after water swelling. The flexibility is required to bridge cracks that could appear due to mechanical stress. Flexible waterproofing membranes in accordance with the present invention provide crack bridging, and can elongate over cracks in masonry to bridge these cracks. If mechanical stress appears to a concrete wall that is covered with a membrane for waterproofing, the waterproofing membrane will move with the stress and cover the resulting cracks to retain a waterproof surface. aqueous emulsion copolymer of the present invention also provides a sufficient pot life while still enabling the applicator to apply new layer of the waterproofing membrane composition on top of a first layer of the composition within from 0.5 to 2 hours.

For the aqueous emulsion copolymer of the present invention, the monomer mixture comprises one or more vinyl aromatic monomers (ii) in the amount of from 0 to 40 wt. %, or, preferably, from 10 to 40 wt. % or, more preferably, from 10 to 30 wt. %, based on total monomer mixture solids.

To increase the stability of the aqueous emulsion copolymer of the present invention and avoid amide addition of above 2 wt. %, which can result in viscosity and water potability issues, the aqueous emulsion copolymer of the present invention may comprise the copolymerization product of up to 1 wt. % of one or more hydroxy-($C_1$ to $C_8$) alkyl (meth)acrylate, preferably, 2-hydroxyethyl methacrylate, 2-hydroxypropyl (meth)acrylate, or mixtures thereof when the copolymer is the copolymerization product of (iii) one or more monomers consisting of amides of a,β-unsaturated $C_3$ to $C_6$ carboxylic acids.

The aqueous emulsion copolymer of component A) may further comprise the copolymerization product of up to 15 wt. % in total, or, preferably, 7 wt. % or less, based on the total monomer solids, of other monomers such as, for example, butadiene, isoprene, isobutylene, ethylene, propylene, vinyl acetate, other vinyl esters of ($C_1$-$C_{12}$) carboxylic acids.

The aqueous emulsion copolymer of the present invention may be made by conventional aqueous emulsion polymerization of free radically polymerizable monomers in the presence of an aqueous initiator, as is conventional in the art. Such aqueous emulsion copolymerization may comprise, for example, gradual addition copolymerization wherein a monomer mixture or, preferably, a monomer emulsion comprising water, monomers and one or more emulsifier and/or surfactant, is fed into a polymerization vessel and is polymerized in the presence of initiator.

Seed polymerization methods may be used.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01 to 3.0 wt. %, or, preferably, from 0.05 to 0.5 wt. %, based on total monomer solids. Redox systems using the above initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used.

Preferably, to insure adequate pot life of the compositions when the two components are combined and to insure the flexibility of the final waterproofing membrane, aqueous emulsion copolymer comprises a residue of an ascorbic acid reducing agent, including ascorbic acid and/or isoascorbic acid, or comprises the copolymerization product of (iii) itaconic acid, or, more preferably, a mixture of itaconic acid and one or more amides of a,β-unsaturated $C_3$ to $C_6$ carboxylic acids, such as acrylamide.

Preferably, to insure fast curing compositions provide sufficient pot life and form a flexible waterproofing membrane, the methods of making the aqueous emulsion copolymer of the present invention comprise copolymerizing the monomers to make the copolymer, followed by feeding or combining the copolymer with an ascorbic acid reducing agent, i.e., as a chase.

It is assumed that any reducing agents combined with the aqueous emulsion copolymer are retained in the final aqueous emulsion copolymer.

Waterproofing membrane fast curing dry mix powder composition component B) generally comprise from 7 to 50 wt. %, for example 30 to 50 wt. % of hydraulic cement, such as ordinary Portland cement, and from 15 to 70 wt. % by weight of non-hydraulic or non-cementitious fillers, such as sand. In addition to hydraulic cement, the component B) comprises a high alumina content cement and may further comprise calcium sulfate. Such ingredients are stored as a fast curing dry mix powder composition and are kept dry until use so that they will not react, thereby remaining free as a flowing powder.

In accordance with the present invention, examples of cement or hydraulic binders include for example, one or more conventional, commercially available ordinary Portland cements, and one or more conventional, commercially available high alumina content cements such as commercially available calcium aluminate cements (CAC), such as Ternal W, a CAC with an alumina content of approximately 70% by weight, produced by Kerneos SA, France, and calcium sulfoaluminate cements (CSA), such as produced by Tangshan Polar Bear Cement Company, Ltd, Hebei Province, China.

The high alumina content cement of the present invention, such as calcium aluminate cement, has an alumina ($Al_2O_3$) content of greater than 30 wt. %, or, preferably greater than 40 wt. %, more preferably greater than 55 wt. %, most preferably at least 70 wt. %, based upon the weight of the high alumina content cement, such as calcium aluminate cement.

Suitable sources or forms of calcium sulfate include anhydrite or gypsum, setting forms (hemi-hydrate), and drying forms (dihydrate), and mixtures thereof.

The fast curing dry mix powder composition of the present invention forms a calcium sulfoaluminate cement. The fast dry materials may comprise a mixture of calcium sulfate, gypsum or anhydrite and high alumina content cement with an alumina ($Al_2O_3$) content of greater than 30% by weight, as clinker, and fillers such as added limestone.

In accordance with the present invention, the fast curing dry mix powder composition component B) may also include fillers. Examples of fillers include, for example, sand such as silica sand and quartz sand, quartz flour, calcium carbonate, dolomite, aluminum silicates, talc or mica, or light weight fillers such as pumice, foamed glass, aerated concrete, perlites or vermiculites. Mixtures of the fillers may also be included.

Fillers may comprise as much as 60 wt. % of the total solids of the two-component compositions or of the final waterproofing membrane.

The fast curing dry mix powder composition of component B) may include other conventional additives in conventional amounts, such as, for example, alkali metal hydroxide and/or alkaline earth metal hydroxide selected from the group consisting of zinc oxide, zinc hydroxide, and zinc hydroxide carbonate; one or more thickener in powder form such as a cellulose ether, such as hydroxyethyl methyl cellulose, or a gum.

Suitable amounts of thickeners may range from 0.01 to 1 wt. %, or, preferably, from 0.01 to 0.5 wt. % of the total solids of the component B) fast curing dry mix powder composition.

In the two-component compositions of the present invention, the weight ratio of polymer solids to total cement solids (Portland cement plus high alumina content cement) may range from 0.4:1 to 2.5:1, or, preferably, from 0.5:1 to 1.5:1

In another aspect of the present invention, methods of making a waterproofing membrane comprise (1) providing the two-component composition of the present invention, (2) mixing it with water, (3) applying to the substrate and drying.

The consistency of a cement composition is adjusted by the water added to the dry mix powder. The water may be added in such an amount to achieve a desired consistency according to end-use requirements.

A suitable water to cement (hydraulic cement plus high alumina content cement) ratio my range from 0.45:1 to 0.6:1.

The composition may be used in products for construction industry and can be used in or to make skim coats, crack isolation membranes, sealing slurries or repair mortars, and as basecoats in exterior insulation finishing systems (EIFS).

Examples of suitable substrates include, for example, a recently hardened waterproofing membrane, plywood, backerboard, water tank, basements, insulation panel, interior wall surfaces, steel reinforcement, aged concrete, hardened concrete, aged mortar, hardened mortar, or a soundproofing panel.

EXAMPLES

The following examples are provided for illustrative purposes only and are not intended to limit the scope of the claims that follow.

Unless otherwise indicated, all parts and percentages are by weight, all temperatures are at room temperature (RT), and all pressures are at standard pressure.

Synthesis Example 1: Making the Aqueous Emulsion Copolymer of Example 1

A multi-neck reaction flask was charged with 290 g deionized (DI) water, 1.9 g of FES 993 (sodium lauryl ethoxy (EO) ether sulfate, 12 EO Units, BASF SE, Ludwigshafen, Germany), and 2.2 g Tergitol 15-S-40 (secondary alcohol ethoxylate—40 EO units, 35 wt. % in water, The Dow Chemical Company, Midland, Mich.). The necks were set up to accommodate an overhead mechanical stirrer, a nitrogen inlet, a thermocouple, a condenser, and two inlets for the addition of reactants via pump. A monomer emulsion of 225 g water, 17 g FES 993, 9.3 g Tergitol 15-S-40, 690 g butyl acrylate (BA), 280 g styrene (STY), 19 g acrylamide (AM), and 5 g 2-hydroxyethyl methacrylate (HEMA) was prepared. The reaction flask was heated to 88 to 94° C. before 29 g of a 9% sodium bicarbonate solution, 50 g of monomer emulsion, and 10.5 g of 10% sodium persulfate solution in water were added to the flask. After the resulting exotherm, the monomer emulsion and 78 g of a 4 wt. % solution of sodium persulfate in water were added over a period of 180 to 240 min while maintaining a temperature of 87 to 92° C. After the end of feeds, the reaction was held at 80 to 90° C. for approximately 30 min before being cooled to 70 to 77° C. Then 5 g of 3.3 wt. % t-butyl hydrogen peroxide solution in water and 6 g of 3 wt. % sodium bisulfite solution in water were added to the flask. Then 24 g each of 8 wt. % t-butyl hydrogen peroxide and 19 wt. % isoascorbic acid solutions in water were added via pump over 1 hour (h). The reaction was cooled to 60° C., and 9 g each of 9 wt. % t-butyl hydrogen peroxide and 9 wt. % isoascorbic acid solutions in water were added before holding the reaction at 55-70° C. for a minimum of 30 min. The product of the reaction had solids content ranging from 55 to 58% and a pH below 5

Synthesis Example 2: Making the Aqueous Emulsion Copolymer of Example 2

The copolymerization was run as in Synthesis Example 1 except that the acrylamide level in the monomer emulsion was cut in half and 10 g of itaconic acid was added to make up for the reduced level of acrylamide. Additionally, the solutions of isoascorbic acid were replaced with a 12 wt. % solution in water of sodium metabisulfite, Brüggemann Chemical, Heilbronn, Germany). The product of the reaction had solids content ranging from 55 to 58% and a pH below 5.

Synthesis Example 3: Making the Aqueous Emulsion Copolymer of Example 3

The copolymerization was run as in Synthesis Example 1 except that in the monomer emulsion, the level of BA was increased to 820 g while the level of STY was decreased to 150 g.

Comparative Synthesis Example 1: Making the Aqueous Emulsion Copolymer of Comparative Example 1

The copolymer was made in the manner disclosed Synthesis Example 1, except that the solutions of isoascorbic acid were replaced with a 20 wt. % solution in water of sodium bisulfite. The product of the reaction has solids content ranging from 55 to 58% and a pH below 7.

Comparative Example 2: Aqueous Emulsion Copolymer

The aqueous emulsion copolymer having the monomer mixture and reagents as listed in Table 2, below, was made by single stage gradual addition emulsion polymerization in the presence of an acrylic emulsion polymer seed, an anionic surfactant and a 15% sodium persulfate solution in water. The emulsion copolymer was cooled to 60 to 70° C. and then residual monomers were chased through the addition of an aqueous solution containing 3 wt. % t-butyl hydrogen peroxide and 0.5 wt. % hydrogen peroxide and, in parallel, a 4 wt. % solution of isoascorbic acid to the flask over a period of 0.75-1 h. The final mixture had solids content ranging from 50 to 55% and a pH of above 5.

Table 1, below, discloses the fast curing dry mix powder composition formulations used in the Examples.

TABLE 1

Fast Cure Dry Mix Formulation

| FAST DRY MIX Ingredients | Wt. % % |
|---|---|
| Ordinary Portland Cement (OPC CEM I 42.5R[1]) | 25.30 |
| Calcium Aluminate Cement (CAC Ternal ™ [2] RG) | 12.00 |
| Snow White ™ [3] filler (CaSO$_4$) | 2.70 |
| Quarzsand ™ [4] F32 (average PS 0.24 mm) | 36.40 |
| Quarzsand ™ [4] F36 (average PS 0.16 mm) | 23.45 |
| WALOCEL ™ [5] MKX 6000 PF01 | |

[1]OPC CEM I 42.5R (From Heidelberger, Germany); OPC CEM I = Ordinary Portland Cement type I Comprising Portland Cement and up to 5% of minor additional constituents. 42.5R-Compressive strength >42.5 after 28 d;
[2] CAC Ternal RG Kerneos SA, France (Calcium Aluminate Cement clinker >99.5 wt. %);
[3] Snow White Filler, USG, CaSO4 >97.68%;
[4] Quarzsand FH 32/FH36, Quarzwerke GmbH, Germany;
[5] Walocel MKX 6000 PF 01 Hydroxyethyl methyl cellulose (HEMC) thickener powder giving a viscosity of 60000 cps (Haake, 2.55 reciprocal seconds) in a 2 wt. % solution in water at room temperature (Dow Chemical, Midland MI);
6. Arbocel PWC 500, J. RETTENMAIER & SÖHNE GMBH + CO, Germany. Natural cellulose fibers;
7. Finntalc M15, MONDO MINERALS B.V. Netherlands, Mg-silicate.

TABLE 2

Emulsion Polymer Compositions

| Emulsion Polymer Materials | Comp Ex. 1 (wt. %) | Comp Ex. 2 (wt. %) | Example 1 (wt. %) | Example 2 (wt. %) | Example 3 (wt. %) |
|---|---|---|---|---|---|
| Monomers | | | | | |
| Butyl acrylate | 70 | | 70 | 69.7 | 82.5 |
| Styrene | 27.6 | | 27.6 | 27.9 | 15.1 |

TABLE 2-continued

Emulsion Polymer Compositions

| Emulsion Polymer Materials | Comp Ex. 1 (wt. %) | Comp Ex. 2 (wt. %) | Example 1 (wt. %) | Example 2 (wt. %) | Example 3 (wt. %) |
|---|---|---|---|---|---|
| 2-ethylhexyl acrylate | | 75 | | | |
| Methyl methacrylate | | 23.3 | | | |
| Acrylamide | 1.9 | 1.8 | 1.9 | 1 | 1.9 |
| 2-hydroxyethyl methacrylate | 0.5 | | 0.5 | 0.5 | 0.5 |
| Itaconic acid | 0 | | 0 | 1 | 0 |
| Surfactants | | | | | |
| FES 993 (sodium lauryl ether sulfate - 12 EO Units) | 1.91 | 0.98 | 1.91 | 1.91 | 1.91 |
| Tergitol 15-S-40 (secondary alcohol ethoxylate - 40 EO units) | 0.49 | 0.48 | 0.49 | 0.49 | 0.49 |
| Sodium dodecylbenzene sulfonate | 0 | 0.49 | 0 | 0 | |
| Chase Package | | | | | |
| Sodium bisulfite | 0.21 | 0 | 0.01 | 0.21 | 0.01 |
| Isoascorbic acid | 0 | 0.18 | 0.36 | 0 | 0.36 |
| Properties[1] | | | | | |
| Particle size (nm) | 200-350 | 300-400 | 245-285 | 225-275 | 245-345 |
| Tg (° C.) | −8 | −35 | −13 | −10 | −30 |
| pH | 4.0-7.0 | 5.0-9.0 | 3.5-4.5 | 3.8-5 | 3.5-4.5 |
| Viscosity (mPas) | <1200 | <800 | 200-700 | 200-600 | 200-1000 |
| Solids (wt. %) | 55-58 | 51-53 | 55-58 | 55-58 | 55-58 |

[1]For all properties with ranges given in the Comparative Examples, the ranges given are target values for the emulsion polymers which the inventors used; no measurements were taken for these polymers. For inventive Examples 1-3, the ranges cover the values actually obtained when more than one sample of the same polymers was used in repeated experiments; all test methods were as described above. The variations in the measured or target values within the ranges given are not critical to making the waterproofing membranes of the present invention.

To formulate the waterproofing membrane compositions or mortars, 100 weight parts aqueous emulsion copolymer indicated in Table 2, above solids and 100 weight parts fast curing dry mix powder composition solids were combined with 77 weight parts water (from wet aqueous emulsion copolymer plus additional water as needed), as described below.

To form the fast curing dry mix powder composition component, the cement, sand, polymer, and thickener were weighed and placed into a plastic (polyethylene) bag and then hand mixed for 2 minutes and conditioned at room temp (23° C.) for 24 hrs. After 24 hours, the aqueous emulsion copolymer component was prepared by adding the polymer and the indicated amount of water into a 2 l polyethylene beaker and stirring for 30 seconds at 200 rpm with a 4-wing stirrer (diameter: 75 mm). Then fast curing dry mix powder component was added within 45 s to the wet component. Stirrer speed was increased continuously from 200 via 700 up to 1100 rpm to have a good vortex in the mass. After combining all components, the paste was stirred for 135 s at 700 rpm to form a mortar.

After stirring was finished, if needed, a waterproofing membrane was formed from the mortar as set forth in the test methods below.

Test Methods

Particle Size: Particle size measurements were carried out using a dilute solution (<5% solids) of aqueous copolymer emulsion in either a Matec CHDF-3000 or Brookhaven BI90Plus Particle Size Analyzer and represent weight average particle sizes. The average of two measurements was used to determine the particle size.

Emulsion Viscosity: Viscosity was measured on the aqueous copolymer emulsions using a Brookfield Digital Viscometer with a stainless steel Brookfield RV-2 spindle at 60 rpm. The average of three measurements was used to determine the viscosity. All measurements were taken at room temperature.

Appearance: A waterproofing membrane was formed by planning the indicated mortar material with a smoothing trowel to cover the area bounded by two 200 mm×10 mm×2.2 mm thick metal slats fixed on opposite (widthwise) sides of a continuous polytetraflouroethylene film substrate (Bytac™ VF-81, SPI Supplies, West Chester, Pa.) resting on a 300×250 mm×10 mm thick poly(vinyl chloride) plate support. Each membrane was dried, the two slats removed, and the membranes were carefully removed from the film substrate after 2 days. The membranes were inspected for the number and appearance of small cracks (<5 mm long), large cracks (>5 mm long), deep cracks and overall appearance. The film substrate was inspected for cracks that might get reproduced in the waterproofing membrane coated on the substrate so that there were no cracks in the substrate film that would influence the tensile test.

Elongation/Tensile Strength: (DIN ISO EN 527-1 and DIN ISO EN 527-2, March, 2010) 2.6 mm thick membranes of each indicated material were made as described in the Appearance test, above. The specimens cured under conditions of 7 days storage at 23° C./50% rel. humidity (RH), 7 days storage at 23° C. (RT)/50% RH followed by 7 days at 23° C. under water and 28 days at 23° C. (RT)/50% RH (7 days followed by 21 more days). After the 7 day RT cure, each of the cured membranes was then cut into fourteen (14 mm)/twenty one (21 mm) dumbbell shape specimens, as in DIN ISO EN 527-2 required type 1B (80 mm L×15 mm W with a narrow center section that is 10 mm W and 20 mm L). Seven (7) specimens of each cured membrane were tested immediately; seven (7) specimens of each cured membrane were cured 7 days under water at RT and then tested. Another seven (7) specimens were cured 21 more days at RT and 50% RH. To test, for each specimen thickness and width was measured at the thin part of the specimen 3 times for calculation of the sectional area before elongation. Elongation and tensile tests were run in a texture analyzer (TA.XT-.plus Texture Analyser, Winopal Forschungsbedarf GmbH, Ahnsbeck, DE) at a speed of 20 mm/min and controlled via computer. Each specimen was fixed in the two clamps of texture analyser (60 mm distance between clamps). Measured was the distance between the clamps over time with the corresponding force needed to elongate the specimen elongated. The readings taken were maximum force; distance at maximum force and the distance at break (the distance at 50% max. force before break was taken, as this could be easy detected). From these readings, the percent elongation and maximum tensile strength, elongation at break and e-modulus or slope of the curve plotted as tensile strength vs. elongation were calculated. Reported values for each indicated material was the average of the seven (7) results calculated from readings for each specimen tested.

Acceptable tensile strength (28d) is ≥0.4 N/mm² (MPa); Acceptable Elongation (28d) is ≥8%

Crack Bridging: According to EN 14891 (March, 2010). For each indicated mortar, concrete specimens (160×50×12 mm) were made from a mix of 28.9 wt. % CEM I 52.5R, 57.8 wt. % quartz sand F36, 0.3 wt. % superplasticiser (Glenium™ 51, BASF, Ludwigshafen, DE) and 13 wt. % water and cured 2 days at 23° C./50% rel. humidity and 26 days under water at 23° C. Once the concrete specimens were cured, each indicated freshly prepared mortar was applied to one concrete specimen using a metal frame of 3 mm thickness to one of the 160×50 mm sides of the specimen and allowed to dry for 4 h. Then, each freshly prepared mortar was applied to the other side of the specimen on which the same mortar had been applied using the same frame. Each specimen was cured 7 days at 23° C./50% rel. humidity. After curing, each cured specimen was broken carefully according to EN 14891 (March, 2010) without destroying the membrane. The broken concrete specimen with the intact membrane was elongated with the texture analyzer at a speed of 0.15 mm/min, and the surface of the membrane was monitored visually. The reported distance was (1) at maximum force (2) when the first cracks appear. Additionally the maximum force was reported. An acceptable result is 0.4 mm, preferably less than 0.4 mm.

Pot-life: For determining the pot-life of a freshly prepared mortar, the viscosity at 23° C. of the mortar of the indicated composition was measured over time with a Brookfield viscometer (Model RVT DV-II, Brookfield Engineering Laboratories Inc., Middleboro, Mass., USA) in combination with a Brookfield Helipath stand (Brookfield Engineering Laboratories Inc., Middleboro, Mass., USA) on a Helipath at 23° C. and 50% rel. humidity, using a T spindle (up to 400 Pa·s, usually changed to spindle T-E after 300 Pa·s was reached) turned at 5 rpm. Each prepared membrane was filled into a 100 ml steel beaker. Air bubbles were avoided during the transfer. The steel beaker was jolted five times by hand and then the surface was smoothed with a scraper. The beaker with the mortar was placed beneath the Brookfield viscometer and the spindle was immersed into the centre of the mortar. The Brookfield viscometer was started and approx. 2 seconds after the display shows a stable figure, the Helipath stand was moved down to 11.5 mm within 30 seconds. The viscosity was measured 30 seconds after the beaker was filled (0 minutes=30 seconds), and the measurement was repeated after the indicated times. To prevent the sample from drying out or forming a skin, the steel beaker was covered by a plastic beaker during resting time between the measurements.

At each indicated time in Table 3, below, viscosity readings were taken after 5, 15, and 25 seconds. After 30 seconds the Helipath stand was switched to "upwards" and at 35, 45 and 55 seconds viscosity was read. For each time indicated in Table 3, below, the viscosity reported was the average of the 6 readings.

Pot life ends when the viscosity reaches a viscosity >1000 Pa·s. An acceptable pot life is at least 120 min.

Density: Immediately after mixing, mortars were placed into a 100 ml steel beaker container of known volume and weight (inside diameter: 54 mm, height: (inside): 43.7 mm, wall thickness: 1.6 mm), tamped down, and then weighed. Density of the mortar is the weight divided by the volume of the mortar.

Time needed to apply second layer: The indicated freshly prepared mortar was applied at 1.3 mm thickness in one layer onto a lime stone brick. By a fingertip test every 5 min the freshness of the membrane was checked. When the membrane is set to the fingertip it is possible to apply a second layer and this time was recorded.

Water Impermeability: According to EN 12390-8 (March, 2010). A hole was drilled in a lime stone brick on the obverse side of the testing surface (nearly piercing ~1 cm away from the testing surface). The indicated freshly made mortar was applied at 1.3 mm thickness in one layer on the lime stone brick. After 4 h a second layer of a freshly made mortar was applied at an added 1.3 mm on the first layer and allowed to dry for 7 days at 23° C. and 50% rel. humidity. A water indication paper (Wator 90610, Macherey-Nagel, Dueren, DE) was put into the drilled hole and then the membrane with the lime stone was put into the water impermeability tester (supplier: TESTING Bluhm & Feuerherdt GmbH, Berlin, DE) and a hydrostatic pressure of 1.5 bars was put on the membrane for 4 days. If the water absorption was less than 25 ml the pressure was raised up to 5 bars. If the absorption was higher the pressure was held additional 3 days at 1.5 bar. After the 7 days the water indication paper was checked. The test is passed if no humidity is seen underneath the membrane. In parallel the water loss over time was read from the calibrated cylinder of the water impermeability tester. In most cases, the membrane is water impermeable if water loss is below 40 ml after 7 days exposure.

Table 3, below, gives test results for each indicated mortar or membrane.

As shown in Table 3, below, inventive Examples 1 and 2 show that a second mortar layer can be applied in 50 min or less to the first applied layer, which is much faster than in the comparative Examples. However, the Comparative Example 1 mortar creates cracks as it cures, whereas the mortars of inventive Examples 1, 2 and 3 do not crack as they cure. Further, viscosity development of the fast setting mortars shows that the inventive mortar compositions have an acceptably long pot life. The membranes made from the mortars of inventive Examples 1, 2 and 3 show a dramatically increased elongation at max force and rupture, as well as maximum force. Finally, the membranes made from the mortars of Examples 1 and 2 exhibit dramatically improved crack bridging when compared to Comparative Examples 1 and 2, both in terms of deformation at maximum force and at rupture. The preferred compositions of the present invention have a glass transition temperature of −20° C. or higher. The inventive compositions this enable one to provide an excellent waterproofing membrane with good pot life, and a rapid cure.

TABLE 3

Results

|  |  | 1* | 2* | Example 1 | Example 2 | Example 3 |
|---|---|---|---|---|---|---|
| Pot Life: Brookfield viscosity (Pas) | | | | | | |
| (time after mixing>>) | 0 min | 54 | 13 | 59 | 108 | 56 |
|  | 5 min | 98 | 16 | 62 | 108 | 61 |
|  | 15 min | 182 | 23 | 68 | 142 | 67 |
|  | 30 min | 569 | 31 | 127 | 221 | 110 |
|  | 45 min | 1000 | 33 | 133 | 326 | 131 |
|  | 60 min |  | 38 | 140 | 480-800 | 133 |
|  | 90 min |  | 40 | 157 | >1000 | 158 |
|  | 120 min |  | 46 | 179 |  | 167 |
| Density (g/cm$^3$) (immediate) |  | 1.42 | 1.26 | 1.42 | 1.37 | 1.26 |
| Time needed to apply second layer (min) |  | 35 | 80 | 50 | 30 | 75 |
| Appearance |  | Plenty of cracks, white spots also on front side | even | even, nice | nearly even, some lumps, white big spots on back side | Moderate rough; nice & even surface; good flexibility |
| Elongation (water immersion, 7 d at RT and 50% RH/7 dH$_2$O) | | | | | | |
| tensile strength (max force, N/mm$^2$) |  | 0.45 | 0.34 | 0.51 | 0.62 | 0.21 |
| average elongation % at max. force |  | 7.5 | 24.1 | 35.8 | 21.6 | 30.7 |
| average elongation % at rupture |  | 13.0 | 29.5 | 99.8 | 40.6 | 41.2 |
| average thickness of layer (mm) |  | 2.1 | 2.2 | 2.0 | 1.9 | 1.8 |
| Crackbridging (after 7 days at RT and 50% RH) | | | | | | |
| max force (N) |  | 149 | 68 | 123 | 164 | 68 |
| deformation at max force (mm) |  | 1.15 | 1.22 | 2.32 | 1.42 | 1.23 |
| deformation at rupture(mm) |  | 3.33 | 2.33 | 7.11 | 4.06 | 2.67 |

*Comparative Example.

We claim:

1. A two-component composition for making a waterproofing membrane comprising as one component A) one or more aqueous emulsion copolymer having a measured glass transition temperature (T$_g$) of from −40 to 0° C. and comprising the residue of a reducing agent, and, as a separate component B) a fast curing dry mix powder composition of a hydraulic cement and a high alumina content cement, wherein the aqueous emulsion copolymer in component A) is the copolymerization product of (i) from 60 to 89.9 wt. % of one or more nonionic (meth)acrylic monomers, (ii) from 10 to 40 wt. % of one or more vinyl aromatic monomers, and (iii) from 0.1 to 2.0 wt. % of one or more monomers chosen from itaconic acid, methacrylic acid, amides of a,β-unsaturated C$_3$ to C$_6$ carboxylic acids, and mixtures thereof, all wt. % s of monomers based on total monomer solids, with the proviso that the aqueous emulsion copolymer has at least one residue of an ascorbic acid reducing agent or is the copolymerization product of a monomer (iii) comprising a mixture of itaconic acid and an amide of a,β-unsaturated C$_3$ to C$_6$ carboxylic acid.

2. The composition as claimed in claim 1 wherein, when the aqueous emulsion copolymer of component A) is the copolymerization product of a monomer (iii) including the one or more amides of a,β-unsaturated C$_3$ to C$_6$ carboxylic acids, it further comprises the copolymerization product of (iv) one or more hydroxyalkyl (meth)acrylate.

3. The composition as claimed in claim 2, wherein the aqueous emulsion copolymer of component A) comprises the copolymerization product of from 0.1 to 1.5 wt. % of (iv) one or more hydroxyalkyl (meth)acrylate, all wt. %s of monomers based on total monomer solids.

4. The composition as claimed in claim 1, wherein the aqueous emulsion copolymer of component A) comprises the copolymerization product of (i) one or more nonionic (meth)acrylic monomers chosen from butyl acrylate, ethyl acrylate, and 2-ethylhexyl acrylate.

5. The composition as claimed in claim 1, wherein the two-component composition comprises from 10 to 60 wt. % as solids of the one or more aqueous emulsion copolymer of component A), based on the total solids content of the composition.

6. The composition as claimed in claim 1, wherein the reducing agent residue in the aqueous emulsion copolymer of component A) is present in amounts of from 0.1 to 0.5 wt. %, based on the total monomer solids used to make the aqueous emulsion copolymer.

7. The composition as claimed in claim 1, wherein the fast curing dry mix powder composition component B) comprises from 1 to 35 wt. % of high alumina content cement, based on total solids in component B).

8. The composition as claimed in claim 1, wherein the fast curing dry mix powder composition component B) comprises from 0 to 15 wt. % calcium sulfate, based on the total solids in component B).

9. The composition as claimed in claim 1, wherein the fast curing dry mix powder composition component B) comprises from 15 to 65 wt. % hydraulic cement, all wt. %s based on the total solids in component B).

10. The composition as claimed in claim 1, wherein the fast curing dry mix powder composition component B) comprises from 30 to 85 wt. % of one or more non-cementitious filler.

\* \* \* \* \*